United States Patent [19]

Kaiser et al.

[11] Patent Number: 4,701,621

[45] Date of Patent: Oct. 20, 1987

[54] MONITOR FOR AIRBORNE RADIOACTIVE PARTICLES

[75] Inventors: Bruce J. Kaiser, Cincinnati; Edward S. Walker, Westchester, both of Ohio; George W. Tunnell, Foster City, Calif.; William Masaitis, Castle Hayne, N.C.

[73] Assignee: General Electric Company, San Jose, Calif.

[21] Appl. No.: 827,700

[22] Filed: Feb. 10, 1986

[51] Int. Cl.⁴ .............................................. G01V 7/04
[52] U.S. Cl. .................................. 250/435; 250/304; 250/370
[58] Field of Search ............... 250/370 A, 304, 432 R, 250/435

[56] References Cited

U.S. PATENT DOCUMENTS

| | | | |
|---|---|---|---|
| 2,972,678 | 2/1961 | Anton | 340/627 |
| 4,013,888 | 3/1977 | Macras et al. | 250/435 |
| 4,140,912 | 2/1979 | Bressan et al. | 250/435 |
| 4,304,994 | 12/1981 | Yamazaki et al | 250/304 |
| 4,464,574 | 8/1984 | Vandrish | 250/432 PD |

FOREIGN PATENT DOCUMENTS 144769   8/1983   Japan ..................... 250/304

OTHER PUBLICATIONS

Technical data sheet for Series 700 Alpha Smart System manufactured by Alpha Nuclear, undated.

Nuclear Instruments & Methods, Vol. 153, No. 1, July 1978, pages 239-251, North-Holland Publishing Co., Amsterdam, NL.

IEEE Transactions on Nuclear Science, Vol. NS-26, No. 1, Feb. 1979, pgs. 757-764, New York, U.S., J. F. Kordas et al.

*Primary Examiner*—Carolyn E. Fields
*Attorney, Agent, or Firm*—R. R. Schroeder; F. Jacob; Raymond G. Simkins

[57] ABSTRACT

A monitor for detecting airborne radioactive particulates is disclosed. An elongate strip of filter paper is fed across first and second air inlet ports of a collection chamber. Ambient air is selectively drawn into the chamber through a selected one of the inlet ports and out an through outlet port. Particulates trapped on an area of the filter paper in alignment with the open inlet port are detected after advancing the strip area into alignment with the closed inlet port. A radiation detector mounted on a movable arm is selectively positioned over the closed inlet port to detect the trapped radioactive particulates, while a new sample is collected at the open inlet port. Exposure of the detector surface to corrosive materials is avoided and the detector can be positioned close to the filter strip to maximize counting efficiency and energy resolution. A microprocessor controls the functions of the monitor and allows continuous unattended operation.

12 Claims, 8 Drawing Figures

MONITOR FOR AIRBORNE RADIOACTIVE PARTICLES

The disclosed invention relates generally to radioactivity monitors and more specifically to monitors for detecting and measuring the radioactivity of airborne particulate matter.

BACKGROUND OF THE INVENTION

In the processing of radioactive materials, e.g., mining, ore processing, or nuclear fuel manufacture, the presence of airborne particles of radioactive material presents a hazard to the health of the workers involved. Concern for personnel health and safety requires that the concentration of airborne particulates be maintained at or below predetermined, safe levels. These concentration limits have been established for each radioactive isotope likely to be encountered, and federal law requires that the actual concentration levels be monitored.

Several devices are now commercially available which continuously measure the airborne concentration of most of the isotopes of concern. These devices generally fall into one of two classes: those in which the collection filter must be changed manually, and those in which the filter is automatically changed. In both, a radiation detector is positioned in close proximity to the filter on which the sample is collected. It is desirable to locate the detector as close to the filter as possible (e.g., less than one millimeter) to maximize counting efficiency and energy resolution. However, in the instruments currently available, the sample collection area is usually immediately in front of the detector. This means that the air sample which is being drawn through the filter also passes over the face of the detector and, if the detector is close to the filter, it disturbs the flow of air through the filter. It is thus necessary to maintain a greater than optimum distance between the filter and detector to avoid both disturbing the air flow and contaminating the surface of the detector. In another known type of monitor in which the filter is changed automatically, the sample collection site is separated from the detector by using a strip of filter paper which first passes over the collection site and subsequently past the detector. Since regulations require that a four minute sample at a minimum airflow rate be periodically taken, this results in the use of a great deal of expensive filter paper. Additionally, this device is not adapted for taking integrated counts where long-term samples are taken over the same portion of filter paper and periodically detected.

OBJECTS OF THE INVENTION

It is therefore a principal object of the present invention to provide a new and improved monitor for airborne radioactive particles which is not subject to the foregoing problems and disadvantages.

It is another object of the present invention to provide a new and improved monitor for airborne radioactive particles having reduced detector surface corrosion and thus increased detector lifetime.

It is still another object of this invention to provide a monitor for airborne radioactive particles having maximized counting efficiency and energy resolution.

It is a further object of this invention to provide a monitor for airborne radioactive particles capable of providing both short-term and long-term airborne radioactive particle concentration data.

It is still a further object of this invention to provide a new and improved monitor for airborne radioactive particles in which the airflow rate is maintained above a predetermined minimum value.

It is a more specific object of this invention to provide a new and and improved monitor for airborne radioactive particles wherein the detector and filter movement operate under computer control based on time, airflow and counting rate to achieve greater flexibility and efficiency.

SUMMARY OF THE INVENTION

The foregoing objects of the invention are achieved through the use of a new and improved monitor for airborne radioactive particles. The monitor includes a chamber having a plurality of air inlet ports, in a preferred embodiment first and second inlet ports both covered by a continuous collector, e.g. a strip of filter paper dispensed from a supply spool to a take-up spool. A radiation detector is mounted on a movable arm such that it can be positioned over the filter paper at either of the two collection sites. Only one inlet port is open at any given time. While an air sample is collected on a discrete area of the filter strip at the first inlet port, the detector is stationed adjacent to another strip area which is positioned over the second inlet port, the latter being closed to air flow into the chamber. Thus, the detector may measure a previously collected sample. By providing separate, suitably spaced sites for collection and detection, none of the sampled air flows over the surface of the detector and the latter may thus be positioned as close to the filter paper as desired to provide maximum counting efficiency and energy resolution, while detector surface corrosion is reduced. In accordance with the present invention, the airflow rate is monitored against a predetermined minimum value. A flow rate below that value is indicative of a clogged filter paper and control means can then automatically advance the strip of filter paper to place a fresh area of paper over the open inlet port.

These and other objects of the present invention, together with the features and advantages thereof, will become apparent from the following detailed specification, when considered in conjunction with the accompanying drawings in which applicable reference numerals are carried forward.

DETAILED DESCRIPTION OF THE INVENTION

Figure 1:
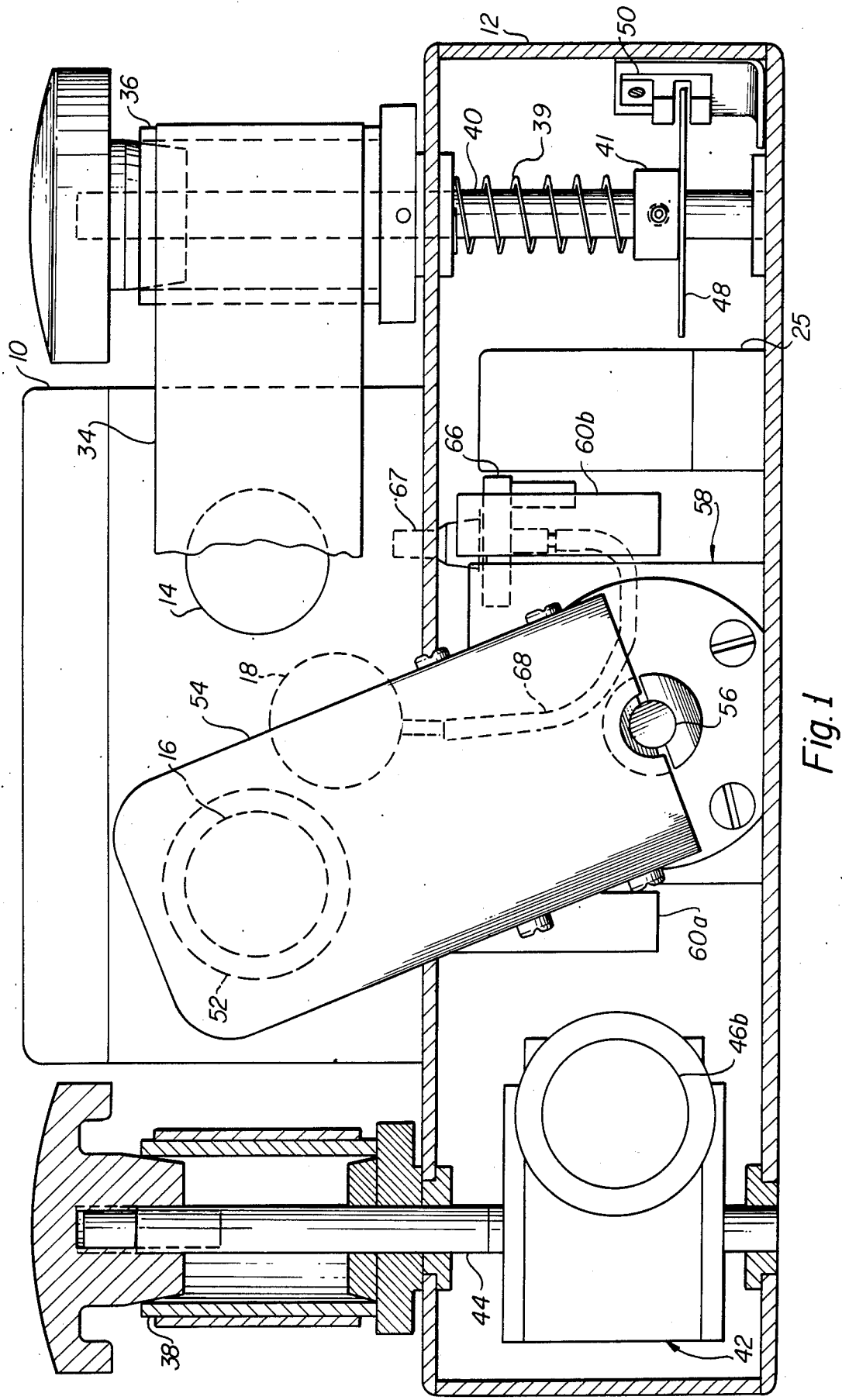
FIG. 1 is a front elevation view, partially cut away, of a preferred embodiment of the present invention.

Referring now to the drawings and specifically to the preferred embodiment illustrated in FIGS. 1-6, an air collection chamber 10 is supported on a monitor body 12 and includes first and second air inlet ports indicated at 14 and 16 respectively. Air collection chamber 10 is maintained at a reduced pressure by a vacuum line 17 connected to an air outlet port 18. Where a vacuum line is not available, the outlet port may be connected directly to a vacuum pump. Two inlet port valves 20 and 22 control the air flow through the inlet ports and are positioned in chamber 10 over inlet ports 14 and 16 respectively. The valves are preferably constructed of plastic to eliminate corrosion problems and to reduce the cost of manufacture.

Figure 2:
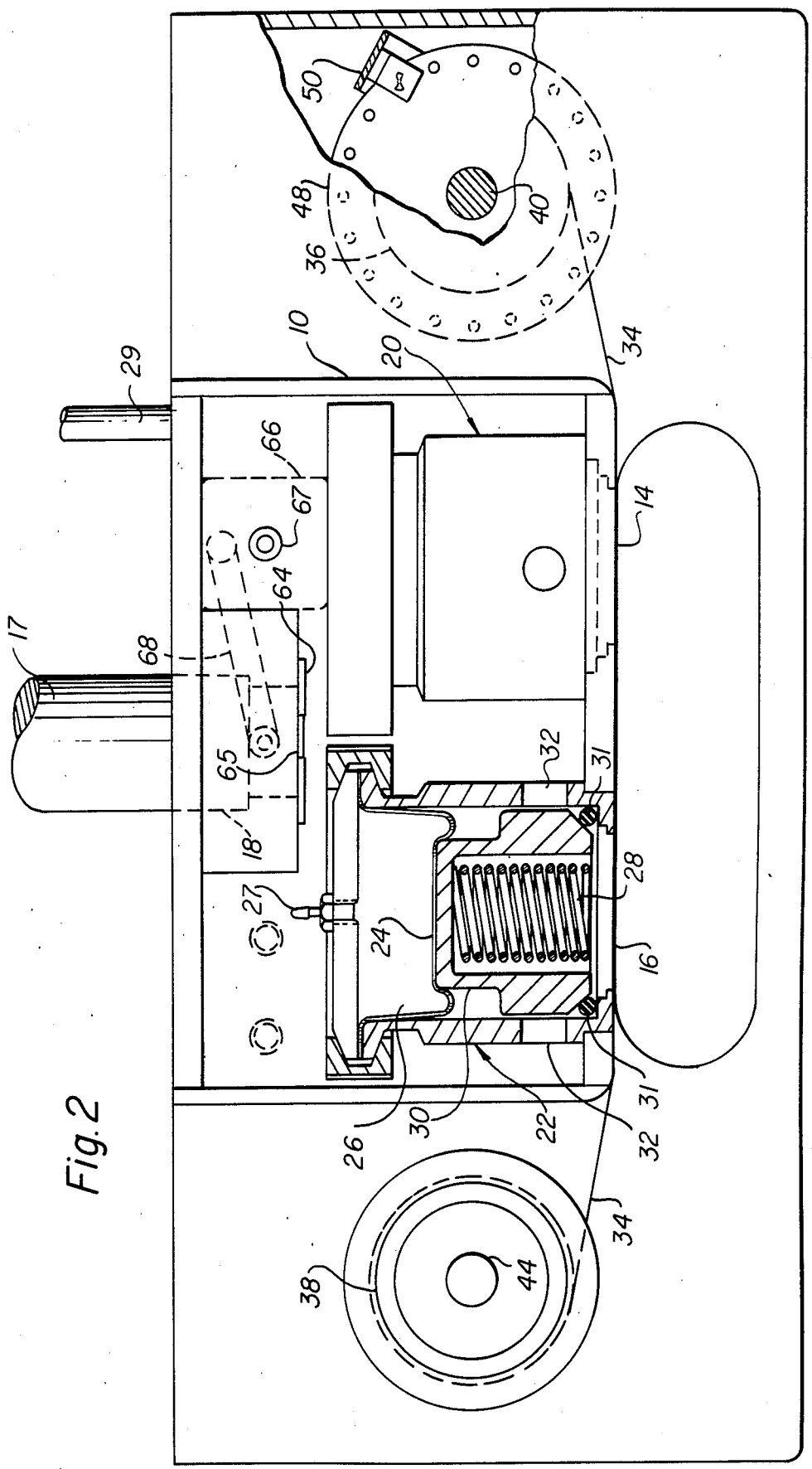
FIG. 2 is a plan view, partially cut away, of the apparatus of FIG. 1.

As illustrated in connection with valve 22 in FIG. 2, valves 20 and 22 each include a rolling diaphragm 24, the position of which is controlled by the air pressure in a cavity 26, as applied through a fitting 27. When the pressure in cavity 26 is at a sufficiently low level, a compression spring 28 urges a poppet 30 to slide backward away from inlet port 16 to a position where it no longer makes contact with a sealing gasket 31 and opens inlet port 16 to the flow of air. The backward movement of poppet 30 opens a plurality of apertures 32 which allow the incoming air to flow into air collection chamber 10 and subsequently out through outlet port 18.

Figure 6:
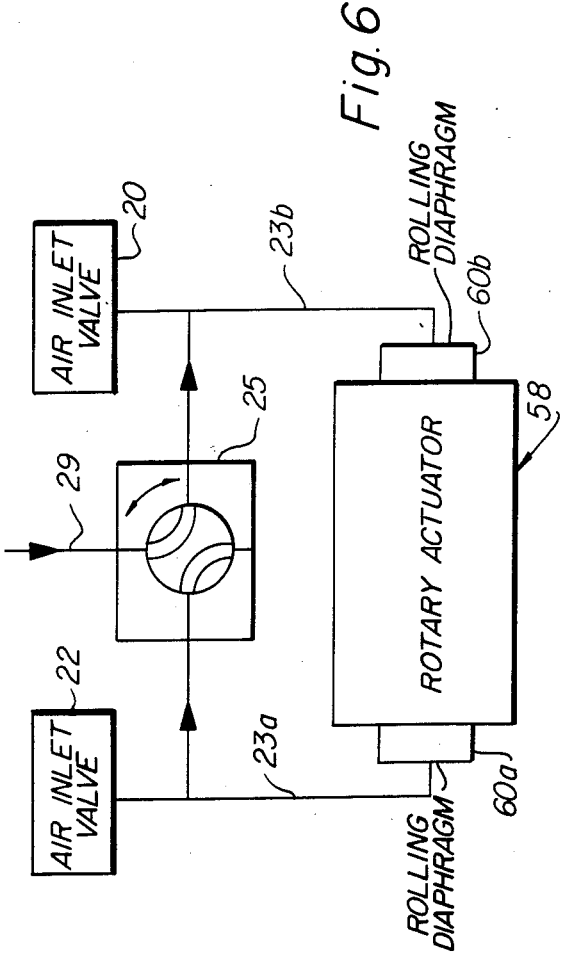
FIG. 6 is a schematic diagram of some of the pressurized air connections of the apparatus of FIG. 1.

A four-way valve 25, shown schematically in FIG. 6, is used to selectively control the pressure to cavity 26 in each of air inlet valves 20 and 22 and thus, the airflow through the two inlet ports. Two air pressure lines 23a, and 23b are connected from four-way valve 25 to air inlet valves 22 and 20 respectively. Air pressure is provided by an outside air pressure line 29 which is connected to valve 25. In accordance with the present invention, inlet valves 20 and 22 are reciprocally pressurized. When valve 25 is in a first position, as shown in FIG. 6, pressure is applied to air inlet valve 20 through air pressure line 23b and air pressure line 23a leading from valve 25 to valve 22 is depressurized. When valve 25 is in a second position, pressure is applied to air inlet valve 22 through line 23a and valve 20 is depressurized. The use of rolling diaphragms in inlet valves 20 and 22 eliminates the need for precision tolerances and for sliding seals in the valve mechanism.

The collector used to trap airborne radioactive particles is a strip of filter paper 34 which is guided across sample collection sites at each inlet port. The strip is dispensed from a supply spool 36 to a take-up spool 38. Ambient air, which is drawn through the open inlet port, must first pass through a discrete area of the filter paper covering that port. Radioactive particles, as well as other particles in the ambient air, are trapped by the filter, specifically on the aforesaid discrete area of the filter strip.

Figure 5B:
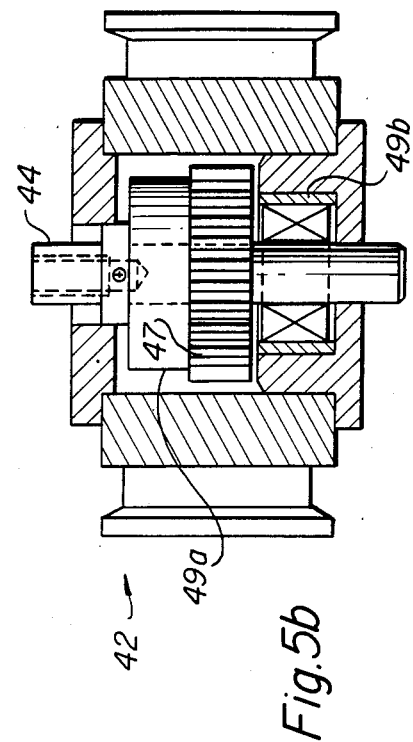
FIGS. 5a and 5b are cross-sectional views of a rotary actuator for the take-up spool of the apparatus of FIG. 1.
Figure 5A:
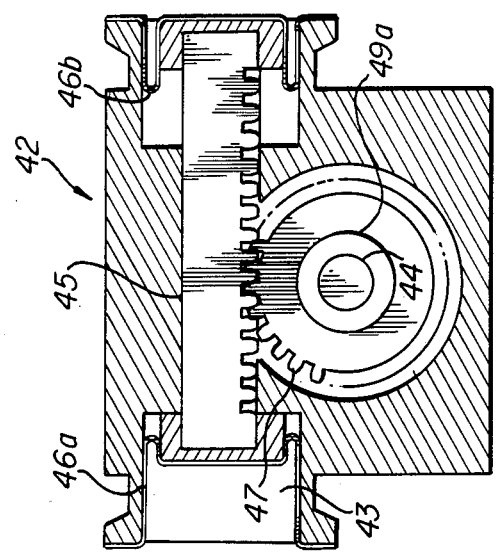

Supply spool 36 is mounted on a rotatable shaft 40. Take-up spool 38 is mounted on a shaft 44 of a rotary actuator 42. Actuator 42 is selectively controlled to rotate take-up spool 38 and to thus advance the strip of filter paper so as to bring fresh areas of paper to the sample collection sites. As shown in FIG. 5a and 5b, rotary actuator 42 includes a rack 45 and a pinion 47 with two rubber rolling diaphragms 46a and 46b positioned at each end of rack 45. By alternately pressurizing a cavity 43 behind each diaphragm, rack 45 is caused to move back and forth. Air pressure lines similar to the ones shown in FIG. 6 pressurize the cavities behind diaphragms 46a and 46b of actuator 42. Rack 45 drives pinion 47 which is connected to output shaft 44 of the rotary actuator by a first one-way clutch 49a, such as the Tiny-Clutch commercially available from Helander Products, Inc. As rack 45 is driven back and forth by the two rolling diaphragms 46a and 46b, output shaft 44 is driven each half cycle in the forward direction only. A second one-way clutch 49b prevents reverse rotation of the shaft when the rack is driven backwards. Thus, the take-up spool, as well as the filter paper strip, advance in one direction only. In a preferred embodiment, each cycle of the take-up spool actuator causes the filter paper to advance approximately one-half inch so that the total travel of the paper can be controlled and varied to meet changing conditions.

An encoder disk 48 is mounted on rotatable shaft 40 which carries supply spool 36. Encoder disk 48 cooperates with a photoswitch 50 to confirm that supply spool 36 rotates upon rotation of take-up spool 38. Failure of spool 36 to rotate under these conditions causes a warning signal to be generated, which is indicative of a break in the strip of filter paper or that the supply spool is empty. Shaft 40 may also have an adjustable friction brake comprising a collar 41 and a spring 39 positioned on the shaft above encoder disk 48 to help control the shaft rotation.

Figure 3:
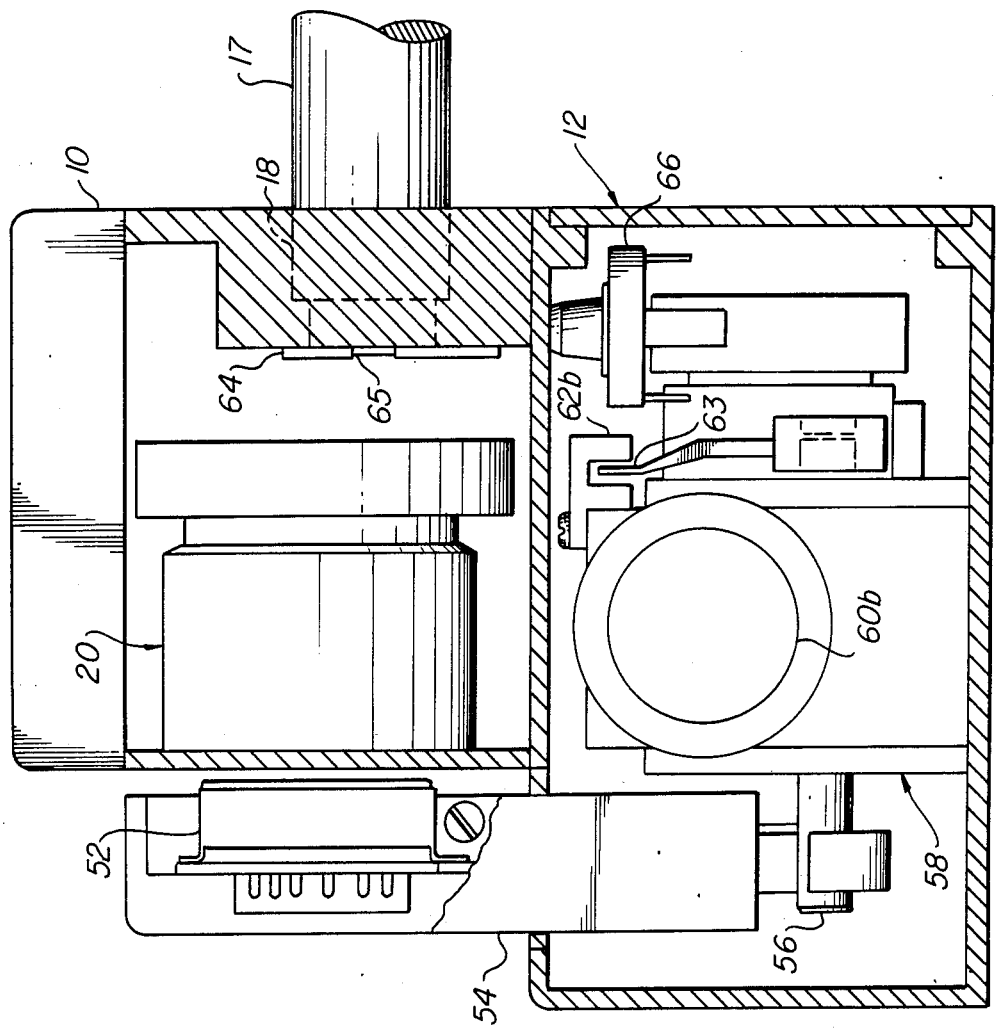
FIG. 3 is a side elevation view, partially cut away, of the apparatus of FIG. 1.
Figure 4:
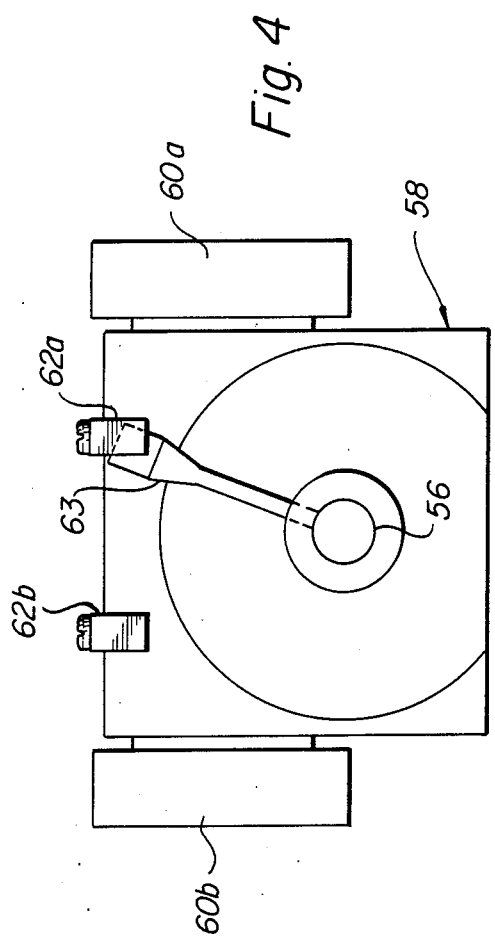
FIG. 4 is a rear elevation view of a movable arm rotary actuator of the apparatus of FIG. 1.

As seen in FIG. 3, a solid state alpha particle detector 52 is mounted on a movable arm 54 so that the detector can be selectively moved from one sample collection site to the other, i.e. into alignment with either one of inlet ports 14 and 16, and positioned in close proximity to filter paper 34 to maximize counting efficiency and energy resolution. Movable arm 54 is mounted on an output shaft 56 of a second rotary actuator 58. The latter may likewise use a rack and pinion, similar to the one shown in FIG. 5. Actuator 58 is driven by two rolling diaphragms 60a and 60b having cavities connected to air pressure lines 23a and 23b respectively. Unlike actuator 42, actuator 58 does not use a one-way clutch and thus output shaft 56 is capable of rotating in both directions as the rack is driven back and forth. As shown in FIG. 6, air pressure lines 23a and 23b are connected so that actuator 58 will align detector 52 with the inlet port which is closed, i.e. the one with the pressurized air inlet valve. As shown in FIGS. 3 and 4, a flag 63 is connected to the end of output shaft 56 opposite from movable arm 54 and is used in conjunction with a pair of photoswitches 62a and 62b to signal when arm 54 is at each end of its stroke.

An orifice plate 64 is positioned over outlet port 18 and has a central orifice 65 to restrict the air flow through the outlet port. A differential pressure switch 66 monitors the difference between the air pressure on the two sides of plate 64. As shown in FIGS. 1 and 2, pressure switch 66 is connected on one side to chamber 10 by a tube 67 and on the other side to outlet port 18 by a hose 68. If the pressure difference falls below a predetermined minimum level, it means that the airflow rate has fallen below a predetermined minimum level, probably due to clogged filter paper or a failure in the vacuum system. When this occurs, the filter paper is caused to advance to bring a fresh area to the sample collection site. If the pressure difference remains below the predetermined minimum level after the filter paper is advanced, the vacuum system must be checked.

Figure 7:
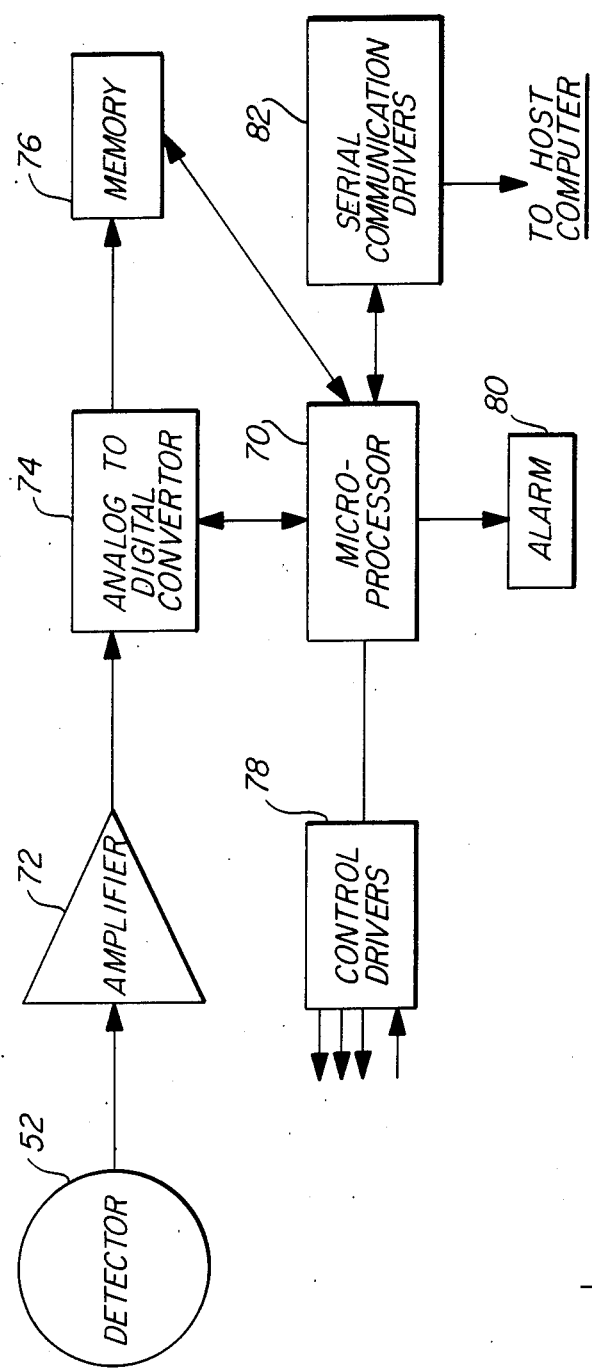
FIG. 7 is a block diagram of a preferred embodiment of the control electronics employed by the present invention.

FIG. 7 shows a preferred embodiment of an electronic control system for the monitor illustrated in FIGS. 1–6. The control system is centered around an internal microprocessor 70 which generally controls the functions of the monitor. Analog signals representative of detected radiation are continuously sent from detector 52 to an amplifier 72 and then to an analog-to-digital converter 74. These digital values are recorded in a memory 76 and are accessible upon command by the microprocessor. Reference numeral 78 designates a number of control drivers which position the movable arm, advance the filter paper and open and close the air inlet valves, respectively under the control of the microprocessor. Condition signals are received by the microprocessor from shaft encoder photoswitch 50 (FIGS. 1 and 2), from the pair of photoswitches 62a and 62b (FIG. 4) associated with movable arm rotary actuator 58, and from differential pressure switch 66. Appropriate responsive commands or alarm signals are given by the microprocessor. An alarm device 80 is actuated when the condition which is being monitored passes a predetermined level.

The present invention may also find application in situations where more than one remote monitoring station is required. In such a situation, a central host computer communicates with the microprocessor in each monitor via a serial communication driver 82 to provide real-time data on airborne radioactive particulate levels.

In operation, the monitor can be programmed to take air samples for various lengths of time and to take repeated samples on the same area of filter paper to provide an integrated count over time. Thus, with cavity 26 of valve 22 pressurized, second inlet port 16 is closed and first inlet port 14 is open. Detector 52 will be positioned over the area of filter paper in front of second inlet port 16. While a timed air sample is being drawn through the filter paper at first port 14, a sample previously taken at second port 16 is measured and recorded. If a short-term sample is needed next, the filter strip can be advanced by a signal from microprocessor 70 to rotary actuator 42 causing the area of filter paper over the first port to be positioned over the second port. This latest sample can then be measured by the detector at second port 16 while a new sample is taken at first port 14. Each time detector 52 takes a new set of measurements, they are recorded in memory 76 under the control of microprocessor 70.

After the sample taken on a fresh area of filter paper at port 14 is completed, valve 20 can be closed while valve 22 is opened. At the same time, rotary actuator 58 moves arm 54 to position detector 52 over port 14. A second air sample can thus be taken through the area of filter paper at second port 16, while the detector is measuring the radiation from particles captured on the area of paper at first port 14. Samples can be alternately collected at the two ports without advancing the filter paper until a new short-term sample is needed or one area of the filter paper becomes clogged. Taking repeated samples on the same area of filter paper provides long-term data on radioactive particulate concentration and reduces the amount of filter paper used. The differential pressure switch will signal the microprocessor of an airflow rate below the predetermined minimum value if the filter paper becomes clogged and the microprocessor will cause a fresh area of paper to be advanced to at least one of the two ports. The sequence of sampling, detecting and moving the filter paper can be modified to fit the needs of the particular application and environment.

While the monitor has been described with two inlet ports, the inventions can be adapted to use additional ports. Further, although it is preferable to do so, the ports need not be located on the same wall of the collection chamber. It is also possible for the sample collector to take the form of a disk of filter paper which rotates discrete areas into position, rather than an elongate strip of filter paper. Precise monitoring of the airflow rate is possible using a quantitative flowmeter in lieu of a differential pressure switch. With quantitative data on the volume of air sampled, precise quantitative radioactive particulate concentration measurements can be provided.

Control system configurations other that the one described above are possible depending on the requirements of the particular application. For example, the control and recording functions may be provided from a remote station, rather than by an on-site microprocessor. Another alternative is a self-contained monitoring unit that alarms when an out-of-limit condition exists. Such a system, while it does not have quantitative measurement capabilities, represents a cost effective approach.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. A radiation monitor for continuously monitoring the concentration of airborne radioactive particulate matter comprising:
   an air collection chamber including a plurality of mutually spaced air inlet ports and an air outlet port;
   means for maintaining said chamber at reduced pressure;
   means for selectively opening a single inlet port at a time to establish an air stream therethrough into said chamber and out through said outlet port;
   a particle collector positioned alongside said inlet ports for trapping airborne radioactive particles on discrete collector areas upon exposure of respective ones of said collector areas to said air stream while positioned over an open inlet port;
   means for selectively advancing said collector areas past said inlet ports;
   radiation detecting means;
   means for selectively positioning said radiation detecting means proximate exposed, selected collector area stationed over a closed inlet port and for maintaining it in position throughout a selected time interval; and
   means responsive to said radiation detecting means for counting and recording the radiation emitted by said proximate collector area;
   whereby said monitor is capable of taking radiation readings on different collector areas, or of taking repeated readings on the same collector ares, to provide an integral radiation count of the ambient air.

2. Apparatus according to claim 1 and further including:

means for monitoring the flow rate of said air stream; and means responsive to a flow rate below a predetermined level for advancing a fresh collector area into place over said open inlet port.

3. Apparatus according to claim 1 and further including:

means for monitoring the flow rate of said air stream; and means responsive to a flow rate below a predetermined level for opening a different one of said plurality of inlet ports.

4. Apparatus according to claim 1 wherein said collector means comprises an elongate strip of filter paper;

a supply spool and a take-up spool spaced from each other with said inlet ports positioned therebetween, said supply spool being adapted to dispense said strip to said take-up spool; and said collector advancing means comprising a rotary actuator adapted to selectively rotate said take-up spool so as to move said strip past said inlet ports.

5. Apparatus according to claim 4 and further including means for detecting a failure of said supply spool to rotate upon rotation of said take-up spool.

6. Apparatus according to claim 1 wherein said radiation detecting means comprises a solid state alpha radiation detector.

7. Apparatus according to claim 1 wherein said inlet ports are disposed on the same side of said chamber substantially in a common plane.

8. Apparatus according to claim 7 wherein said chamber contains a pair of said inlet ports;

said means for positioning said detecting means comprising a rotary actuator including a movable arm extending therefrom, said radiation detecting means being mounted on said arm for movement into substantial alignment with respective ones of said pair of inlet ports; and a pair of photoswitchs for signaling when said arm is at each end of its stroke.

9. Apparatus according to claim 1 wherein said means for maintaining reduced pressure comprises a vacuum pump coupled to said outlet port.

10. Apparatus according to claim 1 wherein said plurality of inlet ports consists of first and second inlet ports disposed on one side of said chamber;

said means for opening a single inlet port at a time comprising first and second air inlet valves for reciprocally opening and closing said first and second inlet ports respectively.

11. Apparatus according to claim 1 and further including means for concurrently controlling the selection of said open inlet port, the position of said radiation detecting means, and the position of said discrete collector areas relative to said inlet ports;

whereby continuous unattended operation of said monitor is provided.

12. A radiation monitor for continuously monitoring the concentration of airborne radioactive particulate matter comprising:

an air collection chamber;

first and second mutually spaced air inlet ports disposed substantially in a common plane on one side of said chamber;

an air outlet port in said chamber;

means connected to said outlet port for maintaining said chamber at reduced pressure;

first and second air inlet valves positioned in said chamber for controlling the air flow through said first and second inlet ports respectively;

means for actuating said valves to provide air flow into said chamber through a single inlet port at a time and out through said outlet port;

an orifice plate mounted over said outlet port for providing a pressure drop in said air flow;

means responsive to a predetermined pressure difference between opposite sides of said orifice plate for detecting when the rate of said air flow is below a predetermined minimum value;

an elongate strip of filter paper;

a supply spool mounted on a rotatable shaft adapted to carry said strip;

a first rotary actuator;

a take-up spool mounted on said first rotary actuator spaced from said supply spool such that said inlet ports are positioned therebetween, said take-up spool being positioned to receive said strip from said supply spool;

said first actuator being to selectively advance said strip from said supply spool to said take-up spool;

a shaft encoder mounted on said rotatable shaft;

a photoswitch positioned to cooperate with said encoder for detecting a failure of said supply spool to rotate upon rotation of said take-up spool;

a second rotary actuator including an arm pivotably mounted so as to be capable of moving through a predetermined angle;

a solid state alpha radiation detector mounted on said arm for movement between a pair of positions in alignment with said first and second inlet ports respectively, said detector positions being in close proximity to separate areas of said strip;

control means for selecting the position of said detector over the inlet port currently closed to said airflow and for controlling the timing of said rotary actuators and of said valve actuating means; and means responsive to said detector for counting and recording the radiation emitted by the proximate particle-bearing area of said strip;

whereby the radiation emitted by said strip areas may be monitored repeatedly for time periods of selected length to determine the concentration of radioactive particulate matter in the ambient air.

* * * * *